(12) United States Patent
Huang (10) Patent No.: US 12,089,145 B2
(45) Date of Patent: Sep. 10, 2024

(54) NETWORK CONNECTION CONTROL METHOD AND RELATED PRODUCTS

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 413 days.

(21) Appl. No.: 17/676,136

(22) Filed: Feb. 19, 2022

(65) Prior Publication Data

US 2022/0174586 A1     Jun. 2, 2022

Related U.S. Application Data

(63) Continuation of application No. PCT/CN2020/104347, filed on Jul. 24, 2020.

(30) Foreign Application Priority Data

Aug. 19, 2019     (CN) .................. 201910765199.X (51) Int. Cl.
*H04W 48/16* (2009.01)
*H04L 61/103* (2022.01)
(Continued)

(52) U.S. Cl.
CPC ........... *H04W 48/16* (2013.01); *H04L 61/103* (2013.01); *H04W 76/30* (2018.02); *H04W 84/12* (2013.01)

(58) Field of Classification Search
CPC ..... H04W 48/16; H04W 76/30; H04W 84/12; H04W 76/15; H04W 76/34; H04W 36/08; H04W 48/20; H04L 61/103
See application file for complete search history.

(56) References Cited

U.S. PATENT DOCUMENTS

| 7,861,076 B2 | 12/2010 | Ponnapalli et al. |
| 9,197,980 B2 * | 11/2015 | Pazhyannur ........ H04L 12/4641 |

(Continued)

FOREIGN PATENT DOCUMENTS

| CN | 1614942 | 5/2005 |
| CN | 101146045 | 3/2008 |

(Continued)

OTHER PUBLICATIONS

Gazis et al, "Self-Management Capacities in Future Internet Wireless Systems", IEEE 2009 (Year: 2009).*

(Continued)

*Primary Examiner* — Omer S Mian
(74) *Attorney, Agent, or Firm* — Hodgson Russ LLP (57) ABSTRACT

Methods for network connection control are provided. A first Access Point (AP) is accessed through a first Wi-Fi network interface of the electronic device, and accessing a second AP through a second Wi-Fi network interface of the electronic device. Connection with the second AP is disconnected in response to detecting a first IP address of the first AP and a second IP address of the second AP are same. A third AP is determined based on a first MAC address of the first AP and a second MAC address of the second AP. A third AP is accessed through the second Wi-Fi network interface. The third AP through the second Wi-Fi network interface. It is beneficial to release the corresponding connection and re-selecting a new hotspot in time when there is a gateway IP conflict. It guarantees the network quality and improves the efficiency network connection control.

20 Claims, 6 Drawing Sheets

(51) Int. Cl.
*H04W 76/30* (2018.01)
*H04W 84/12* (2009.01)

(56) References Cited

U.S. PATENT DOCUMENTS

| | | | |
|---|---|---|---|
| 9,806,970 B2 * | 10/2017 | Sabet | ............ H04L 41/12 |
| 2007/0133544 A1 | 6/2007 | Shida | |
| 2008/0056133 A1 | 3/2008 | Deshpande et al. | |
| 2014/0092425 A1 | 4/2014 | Park | |
| 2017/0078206 A1 | 3/2017 | Huang et al. | |
| 2017/0196034 A1 * | 7/2017 | Jung | ............ H04W 76/14 |
| 2018/0219944 A1 * | 8/2018 | Kwon | ............ H04L 67/104 |
| 2019/0098566 A1 | 3/2019 | Li et al. | |

FOREIGN PATENT DOCUMENTS

| | | |
|---|---|---|
| CN | 102869031 | 1/2013 |
| CN | 103298148 | 9/2013 |
| CN | 104038982 | 9/2014 |
| CN | 104080148 | 10/2014 |
| CN | 105072669 | 11/2015 |
| CN | 106102098 | 11/2016 |
| CN | 106332069 | 1/2017 |
| CN | 106376054 | 2/2017 |
| CN | 107483236 | 12/2017 |
| CN | 107508931 | 12/2017 |
| CN | 107770842 | 3/2018 |
| CN | 109922469 | 6/2019 |
| WO | 0209458 | 1/2002 |
| WO | 2015196396 | 12/2015 |

OTHER PUBLICATIONS

Zimmermann et al, "IP Address Assignment in Wireless Mesh Networks", IEEE, 2008 (Year: 2008).*
EPO, Extended European Search Report for EP Application No. 20854396.7, Aug. 2, 2022.
CNIPA, Notification to Grant Patent Right for Invention for CN Application No. 201910765199.X, Apr. 21, 2021.
CNIPA, First Office Action for CN Application No. 201910765199.X, Dec. 16, 2020.
WIPO, International Search Report for PCT/CN2020/104347, Oct. 21, 2020.

* cited by examiner

NETWORK CONNECTION CONTROL METHOD AND RELATED PRODUCTS

CROSS REFERENCE

This application is a continuation of International Patent Application No. PCT/CN2020/104347, filed Jul. 24, 2020, which claims priority to Chinese Patent Application No. 201910765199.X, filed Aug. 19, 2019, the entire disclosures are incorporated herein by reference.

TECHNICAL FIELD

The present disclosure relates to electronic devices, and more particular, to a network connection control method and related products.

BACKGROUND

Nowadays, Wireless Fidelity (Wi-Fi) is widely used in mobile phone and other mobile terminals. Mobile phone users almost use Wi-Fi function every day. Therefore, the Internet speed is more and more important. At present, chip manufacturers design hardware products that support dual Wi-Fi. A mobile terminal device can connect to two different Wi-Fi hotspots at the same time based on the hardware.

When the terminal device works in dual Wi-Fi mode, it can connect to two different Wi-Fi networks at the same time, each of which has its default gateway. If the two Wi-Fi networks belong to two different access point devices (such as wireless routers), and the default gateway IP addresses of the two access points are the same. It will be a problem of gateway IP address conflict.

SUMMARY

According to a first aspect, embodiments provide a network connection control method for an electronic device. The method includes the following.

A first Access Point, AP, is accessed through a first Wireless-Fidelity, Wi-Fi, network interface of the electronic device, and accessing a second AP through a second Wi-Fi network interface of the electronic device.

Connection with the second AP is disconnected in response to detecting a first Internet Protocol, IP, address of the first AP and a second IP address of the second AP are same.

A third AP is determined based on a first Media Access Control, MAC, address of the first AP and a second MAC address of the second AP.

A third AP is accessed through the second Wi-Fi network interface.

According to a second aspect, embodiments provide an electronic device. The electronic device comprises one or more processors, and memory configured to store instructions which, when executed by the one or more processors, cause the one or more processors to access a first Access Point, AP, through a first Wireless-Fidelity, Wi-Fi, network interface of the electronic device, and access a second AP through a second Wi-Fi network interface of the electronic device; disconnect connection with the second AP in response to detecting a first Internet Protocol, IP, address of the first AP and a second IP address of the second AP are same; determine a third AP based on a first Media Access Control, MAC, address of the first AP and a second MAC address of the second AP; and access a third AP through the second Wi-Fi network interface.

According to a third aspect, embodiments provide a non-transitory computer-readable storage medium. The non-transitory computer-readable storage medium stores one or more programs computer programs for electronic data exchange, wherein the one or more programs are configured to be executed to perform some or all of the operations in any method in the first aspect.

DRAWINGS

The present disclosure, in accordance with one or more various embodiments, is described in detail with reference to the following figures. The figures are provided for purposes of illustration only and merely depict typical or example embodiments.

DETAILED DESCRIPTION

Technical solutions in embodiments of the present disclosure will be described clearly and completely hereinafter with reference to the accompanying drawings. The described embodiments are merely examples and other embodiments are contemplated by the present disclosure. All other embodiments obtained by those of ordinary skill in the art based on the embodiments of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of operations or units is not limited to the listed operations or units, on the contrary, it can optionally include other operations or units that are not listed; alternatively, other operations or units inherent to the process, method, product, or device can be included either.

The term "embodiment" referred to herein means that a particular feature, structure, or feature described in conjunction with the embodiment may be contained in at least one embodiment of the present disclosure. The term embodiment as used herein does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

The electronic device involved in the embodiments of the present disclosure may be transmit data wirelessly. The electronic device may include various handheld devices, in-vehicle devices, wearable devices, computing devices that have wireless communication functions or other processing devices connected to the wireless modem, as well as various forms of user equipment (UE), mobile stations (MS), terminal devices, and the like.

The following elaborates on some embodiments of the disclosure.

Figure 1A:
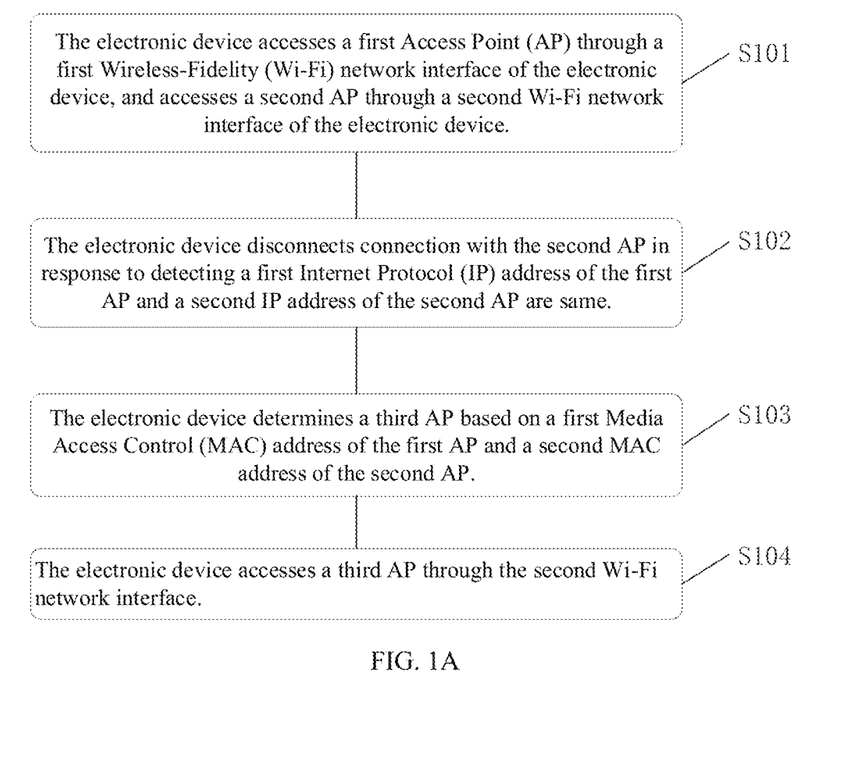
FIG. 1A is a schematic flow chart illustrating a network connection control method according to embodiments.

FIG. 1A is a schematic flow chart illustrating a network connection control method according to embodiments, performed by an electronic device, comprises the following.

At block S101, the electronic device accesses a first Access Point (AP) through a first Wireless-Fidelity (Wi-Fi) network interface of the electronic device, and accesses a second AP through a second Wi-Fi network interface of the electronic device.

Alternatively, the first AP and the second AP are different access point device.

At block S102, the electronic device disconnects connection with the second AP in response to detecting a first Internet Protocol (IP) address of the first AP and a second IP address of the second AP are same.

Alternatively, in response to detecting the first IP address of the first AP and the second IP address of the second AP are same, the electronic device maintains an independent ARP cache for the first network assessed by the second Wi-Fi network interface and the second network assessed by the second Wi-Fi network interface respectively in an ARP cache of the electronic device. The first network and the second network only query its own cache.

At block S103, the electronic device determines a third AP based on a first Media Access Control (MAC) address of the first AP and a second MAC address of the second AP.

At block S104, the electronic device accesses a third AP through the second Wi-Fi network interface.

Embodiment provides a network connection control method and related products, performed by the electronic device. The method comprises: accessing a first Access Point (AP) through a first Wireless-Fidelity (Wi-Fi) network interface of the electronic device, and accessing a second AP through a second Wi-Fi network interface of the electronic device; disconnecting connection with the second AP in response to detecting a first Internet Protocol (IP) address of the first AP and a second IP address of the second AP are same; determining a third AP based on a first Media Access Control (MAC) address of the first AP and a second MAC address of the second AP; and accessing a third AP through the second Wi-Fi network interface. Determining the third AP according to the first MAC address of the first AP and the second MAC address of the second AP, and then accessing the third AP, is beneficial to release the corresponding connection and re-selecting a new hotspot in time when there is a gateway IP conflict and the electronic device is in dual Wi-Fi mode. It guarantees the network quality and is conducive to improve the efficiency and convenience of network connection control.

In an embodiment, the electronic device determines the third AP based on the first MAC address of the first AP and the second MAC address of the second AP, comprising: the electronic device obtains a plurality of APs scanned by the second Wi-Fi network interface. The electronic device stores the first MAC address and the second MAC address in a blacklist. The electronic device matches MAC address of each of the plurality of APs with the blacklist, and determines the third AP, the third AP being one of the plurality of APs, the third AP satisfying a third MAC address of the third AP is not in the blacklist.

Alternatively, determining the third AP, the third AP being one of the plurality of APs, comprises: matching MAC address of each of the plurality of APs with the blacklist; selecting an AP with best network quality among the at least one AP as the third AP according to the match result.

Alternatively, the electronic device obtains a plurality of APs scanned by the second Wi-Fi network interface, including AP1, AP2 and AP3. The electronic device stores the first MAC address and the second MAC address in the blacklist, and then matches MAC address of AP1, AP2, AP3 with the blacklist P respectively. It is found that the first MAC address of AP1 is not in the blacklist P. The AP1 is determined as the third AP.

Embodiment shows that the electronic devices obtains a plurality of APs scanned by the second Wi-Fi network interface and stores the first MAC address and the second MAC address in a blacklist, and matches MAC address of each of the plurality of APs with the blacklist, and determining the third AP, the third AP being one of the plurality of APs. Determining the third AP according to the first MAC address and the second MAC address is beneficial to select an appropriate AP more conveniently and quickly, and it is helpful to improve the effectiveness of network connection control.

In an embodiment, the electronic device matches MAC address of each of the plurality of APs with the blacklist, and determines one of the plurality of APs as the third AP, comprising: The electronic device matches the MAC address of each of the plurality of APs with the blacklist, and determines the MAC address of the at least one AP is not in the blacklist. The electronic device obtains the network quality of the at least one AP, and selects an AP with best network quality among the at least one AP as the third AP Alternatively, the electronic device obtains a plurality of APs scanned by the second Wi-Fi network interface, including AP1, AP2 and AP3. The electronic device stores the first MAC address and the second MAC address in the blacklist P and then matches MAC address of AP1, AP2, AP3 with the blacklist P respectively. It is found that the first MAC address of AP1 and the second MAC address of AP2 is not in the blacklist P. The network quality of AP1 and AP2 is obtained and the signal strength of AP1 and AP2 is compared. If the signal strength of AP2 is stronger, the AP2 is determined as the third AP.

Embodiment shows that the electronic devices matches MAC address of each of the plurality of APs with the blacklist, and determines MAC address of at least one AP is not in the blacklist, and obtains network quality of the at least one AP, and selects an AP with best network quality among the at least one AP as the third AP. It is beneficial to select an appropriate AP more conveniently and quickly, and it is helpful to improve the effectiveness of network connection control.

In an embodiment, after the electronic device accesses a third AP through the second Wi-Fi network interface, the method further comprises: the electronic device performs following operations until IP address and MAC address of two APs accessed by the electronic device are different. The electronic device determines whether the IP addresses of the two APs currently accessing by the electronic device are same. If same, the electronic device updates the blacklist and obtains the updated blacklist, and disconnects connection between the second Wi-Fi network interface and the third AP. The electronic device determines a fourth AP based on the updated blacklist. The electronic device accesses the fourth AP through the second Wi-Fi network interface.

Alternatively, two APs currently accessed by the electronic device may be the first AP and the third AP, or the AP accessed by the first Wi-Fi network interface changes from the first AP to a new AP. At this time, the two APs currently accessed by the electronic device may be the new AP and the third AP.

Alternatively, after the mobile phone accesses "GUEST2" through the second Wi-Fi network interface, the phone determines whether the IP address of currently accessed "GUEST2" and IP address of "SZ" are the same. If same, the blacklist is updated and the phone obtains the updated blacklist. The phone disconnects connection between the second Wi-Fi network interface and "GUEST2", then determines "CS" according to the updated blacklist. The phone accesses "CS" through the second Wi-Fi network interface.

Alternatively, after the mobile phone accesses "GUEST2" through the second Wi-Fi network interface, the phone determines whether the IP address of currently accessed "GUEST2" and IP address of "SZ" are the same. If not same, there is no conflict of IP address. The connection state is maintained.

Embodiment shows after the electronic device accesses a third AP through the second Wi-Fi network interface, the electronic device determines whether the IP addresses of the two APs currently accessing by the electronic device are same. If same, the blacklist is updated and the electronic device obtains the updated blacklist. The electronic device disconnects connection between the second Wi-Fi network interface and the third AP, and then determines a fourth AP based on the updated blacklist, and finally accesses the fourth AP through the second Wi-Fi network interface. Performing the above operations until IP address and MAC address of two APs accessed by the electronic device are different with each other. It is beneficial to avoid network connection problems caused by IP address conflicts, and help improve the effectiveness and convenience of network connection control In another embodiment, the electronic device updates the blacklist, comprising: the electronic device detects that an AP currently accessed by the first Wi-Fi network interface is the first AP and detects that an AP currently accessed by the second Wi-Fi network interface is the third AP. The electronic device stores the third MAC address in the blacklist.

Figure 1B:
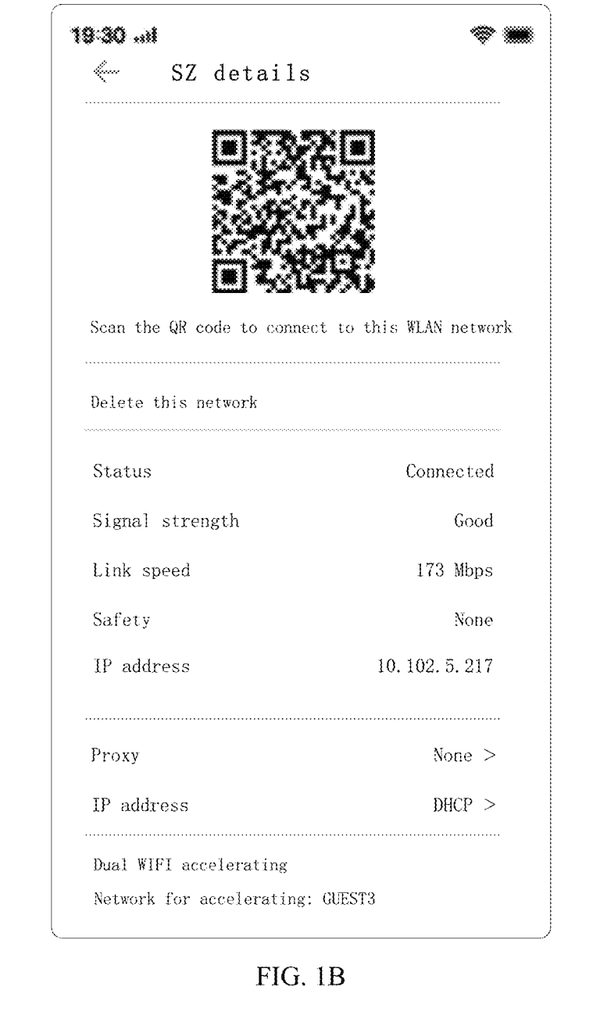
FIG. 1B is a schematic diagram of the interface of the Wi-Fi connection details page according to embodiments of the present disclosure.

Alternatively, the electronic device detects that "SZ" is currently accessed by the first Wi-Fi network interface, which is the same with the network accessed by the first Wi-Fi interface. The electronic device detects that "GUEST3" is currently accessed by the second Wi-Fi network interface, which is illustrated in FIG. 1B. The electronic device stores the third MAC address, MAC3, of "GUEST3" in the updated blacklist.

Embodiment shows that the electronic device detects that an AP currently accessed by the first Wi-Fi network interface is the first AP and detects that an AP currently accessed by the second Wi-Fi network interface is the third AP. The electronic device stores the third MAC address in the updated blacklist. At this time, the first MAC address, the second MAC address, the third MAC address are in the blacklist. It is beneficial to update the blacklist and ensure the real-time validity of the blacklist In another embodiment, the electronic device updates the blacklist, comprising: the electronic device detects that an AP currently accessed by the first Wi-Fi network interface is the fifth AP and detects that an AP currently accessed by the second Wi-Fi network interface is the third AP. The electronic device determines the fifth MAC address of the fifth AP is same with the first MAC address or the second MAC address in the blacklist. The electronic device stores the third MAC address in the updated blacklist.

Figure 1C:
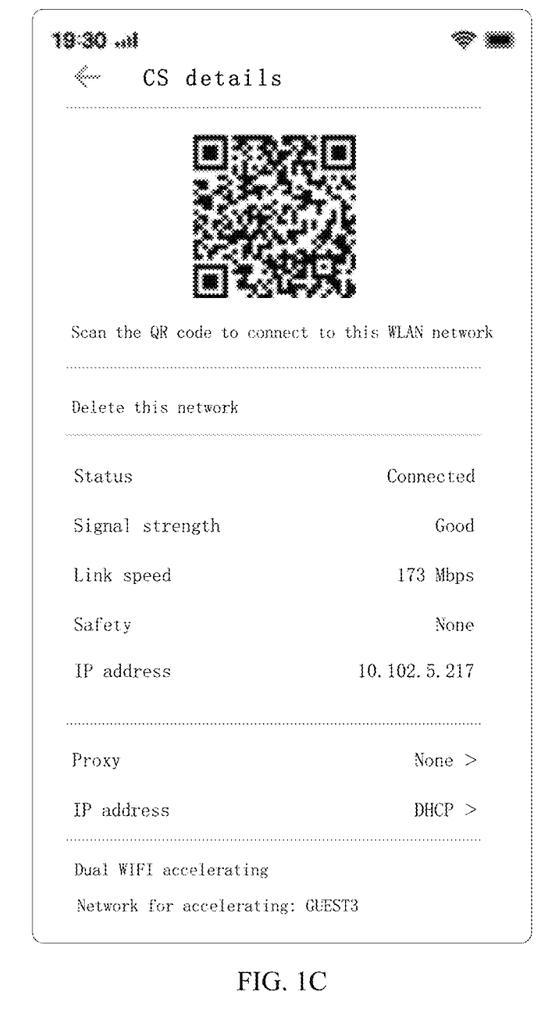
FIG. 1C is a schematic diagram of the interface of the Wi-Fi connection details page according to other embodiments of the present disclosure.

Alternatively, the electronic device detects that "CS" is currently accessed by the first Wi-Fi network interface, which is different with the network "SZ" accessed by the first Wi-Fi interface before. The electronic device detects that "GUEST3" is currently accessed by the second Wi-Fi network interface, which is illustrated in FIG. 1C. The electronic device determines a fifth MAC address of "CS" is same with the second MAC address in the blacklist. The electronic device stores the third MAC address in the updated blacklist.

Embodiment shows that the electronic device detects that an AP currently accessed by the first Wi-Fi network interface is the fifth AP and detects that an AP currently accessed by the second Wi-Fi network interface is the third AP. The electronic device determines a fifth MAC address of the fifth AP is same with the first MAC address or the second MAC address in the blacklist, and stores the third MAC address in the updated blacklist. At this time, the first MAC address, the second MAC address, the third MAC address are in the blacklist. It is beneficial to update the blacklist and ensure the real-time validity of the blacklist.

In another embodiment, the electronic device updates the blacklist, comprising: the electronic device detects that an AP currently accessed by the first Wi-Fi network interface is the fifth AP and detects that an AP currently accessed by the second Wi-Fi network interface is the third AP, which is illustrated in FIG. 1C. The electronic device determines the fifth MAC address of the fifth AP is different with the first MAC address or the second MAC address in the blacklist. The electronic device clears the blacklist and stores the fifth MAC address and the third MAC address in the updated blacklist.

Alternatively, the electronic device detects that an AP currently accessed by the first Wi-Fi network interface is "CS" which is different with "SZ" accessed by the first network interface before. The electronic device detects an AP currently accessed by the second Wi-Fi network interface is "GUEST3". The electronic device determines the fifth MAC address of "CS" is different with the first MAC address or the second MAC address in the blacklist. The electronic device clears the blacklist and stores the fifth MAC address and the third MAC address in the updated blacklist.

Embodiment shows that the electronic device detects that an AP currently accessed by the first Wi-Fi network interface is the fifth AP and detects that an AP currently accessed by the second Wi-Fi network interface is the third AP. The electronic device determines the fifth MAC address of the fifth AP is different with the first MAC address or the second MAC address in the blacklist. The electronic device clears the blacklist and stores the fifth MAC address and the third MAC address in the updated blacklist. At this time, the fifth MAC address and the third MAC address is in the blacklist. It is beneficial to update the blacklist and ensure the real-time validity of the blacklist.

Figure 2:
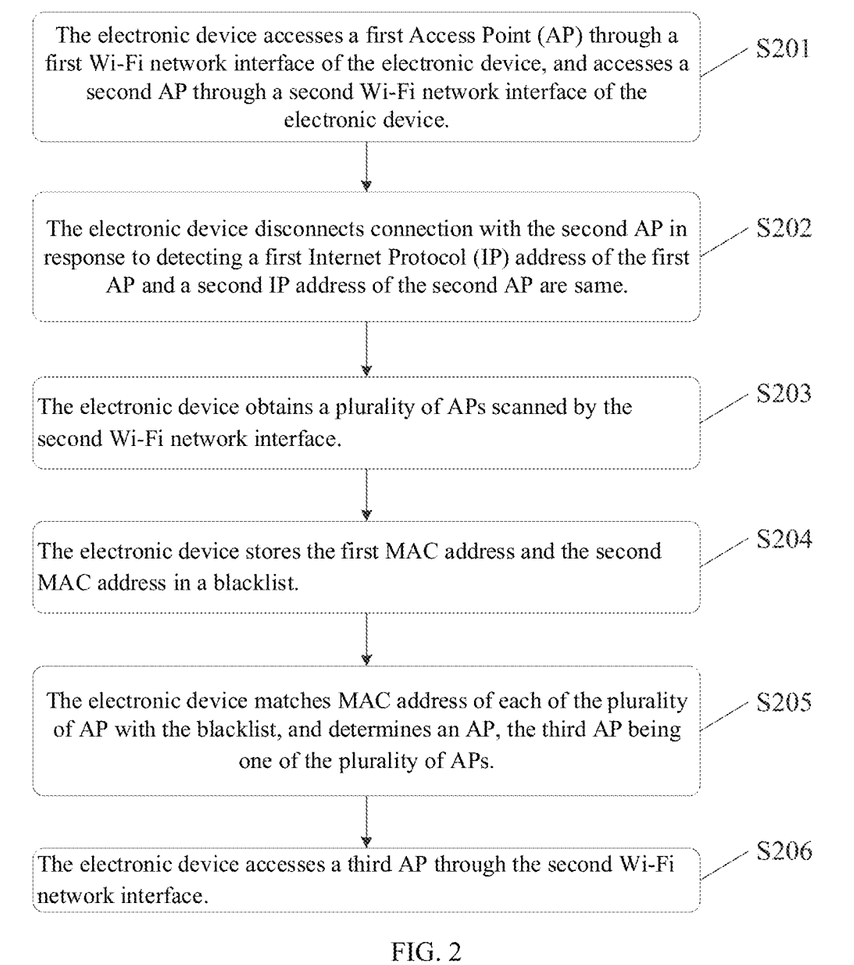
FIG. 2 is a schematic flow chart illustrating a network connection control method according to other embodiments of the present disclosure.

In accordance with FIG. 1A, FIG. 2 is a schematic flow chart illustrating a network connection control method according to embodiments of the present disclosure, performed by an electronic device. The method comprises the following.

At block S201, the electronic device accesses a first Access Point (AP) through a first Wi-Fi network interface of the electronic device, and accesses a second AP through a second Wi-Fi network interface of the electronic device.

At block S202, the electronic device disconnects connection with the second AP in response to detecting a first Internet Protocol (IP) address of the first AP and a second IP address of the second AP are same.

At block S203, the electronic device obtains a plurality of APs scanned by the second Wi-Fi network interface.

At block S204, the electronic device stores the first MAC address and the second MAC address in a blacklist.

At block S205, the electronic device matches MAC address of each of the plurality of APs with the blacklist, and determines the third AP, the third AP being one of the plurality of APs.

At block S206, the electronic device accesses a third AP through the second Wi-Fi network interface.

Embodiments provide a network connection control method and related products, performed by the electronic device. The method comprises: the electronic device accesses a first Access Point (AP) through a first Wi-Fi network interface of the electronic device, and accesses a second AP through a second Wi-Fi network interface of the electronic device. The electronic device disconnects connection with the second AP in response to detecting a first Internet Protocol (IP) address of the first AP and a second IP address of the second AP are same. The electronic device determines a third AP based on a first Media Access Control (MAC) address of the first AP and a second MAC address of the second AP and accesses a third AP through the second Wi-Fi network interface. Determining the third AP according to the first MAC address of the first AP and the second MAC address of the second AP, and then accessing the third AP, is beneficial to release the corresponding connection and re-selecting a new hotspot in time when there is a gateway IP conflict and the electronic device is in dual Wi-Fi mode. It guarantees the network quality and is conducive to improve the efficiency and convenience of network connection control.

In addition, the electronic device obtains a plurality of APs scanned by the second Wi-Fi network interface and stores the first MAC address and the second MAC address in a blacklist, then matches MAC address of each of the plurality of APs with the blacklist, and determines the third AP, the third AP being one of the plurality of APs, finally determines the third AP according to the first MAC address and the second MAC address. It is beneficial to select an appropriate AP more conveniently and quickly, and it is helpful to improve the effectiveness of network connection control.

Figure 3:
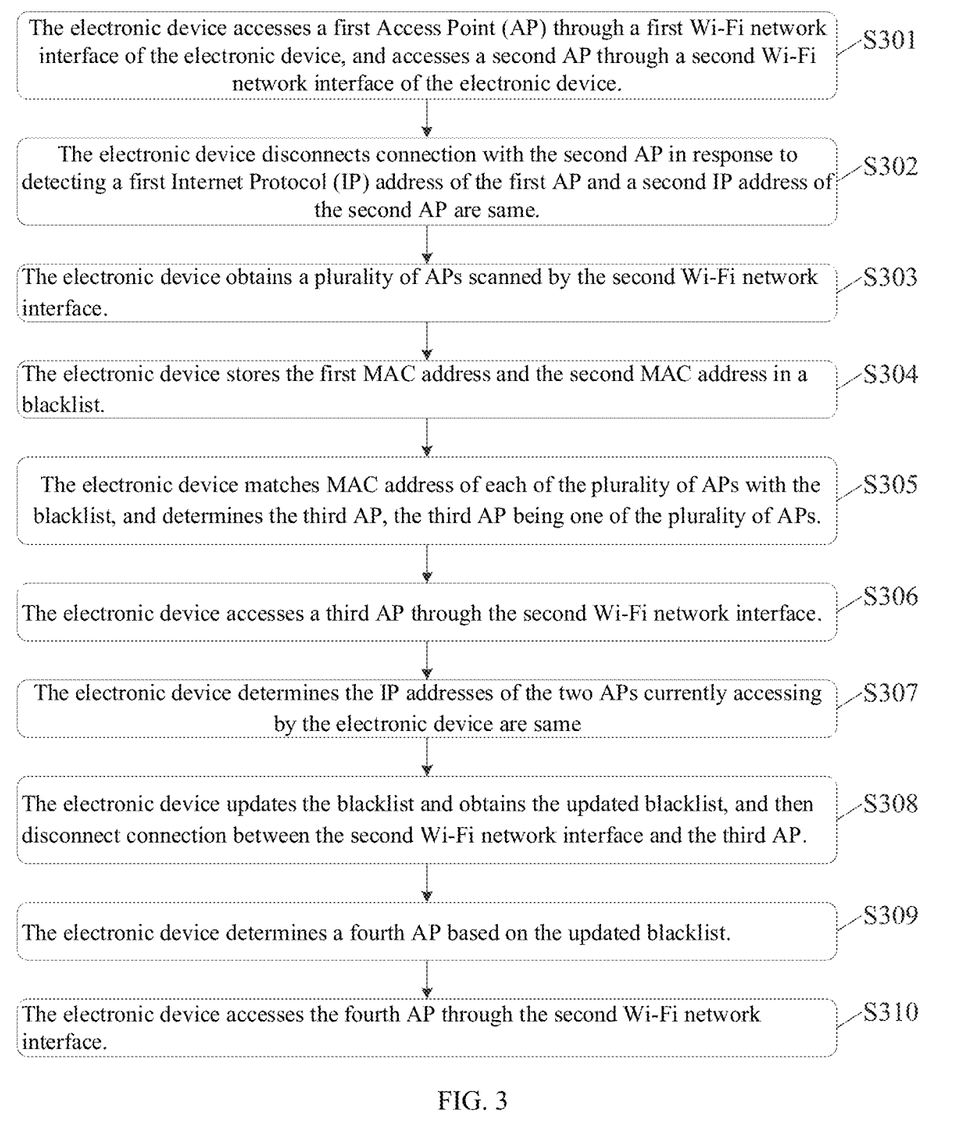
FIG. 3 is a schematic flow chart illustrating a network connection control method according to other embodiments of the present disclosure.

In accordance with FIG. 1A, FIG. 3 is a schematic flow chart illustrating a network connection control method according to embodiments of the present disclosure, performed by an electronic device. The method comprises the following.

At block S301, the electronic device accesses a first Access Point (AP) through a first Wi-Fi network interface of the electronic device, and accesses a second AP through a second Wi-Fi network interface of the electronic device.

At block S302, the electronic device disconnects connection with the second AP in response to detecting a first Internet Protocol (IP) address of the first AP and a second IP address of the second AP are same.

At block S303, the electronic device obtains a plurality of APs scanned by the second Wi-Fi network interface.

At block S304, the electronic device stores the first MAC address and the second MAC address in a blacklist.

At block S305, the electronic device matches MAC address of each of the plurality of APs with the blacklist, and determines the third AP, the third AP being one of the plurality of APs.

At block S306, the electronic device accesses a third AP through the second Wi-Fi network interface.

At block S307, the electronic device determines the IP addresses of the two APs currently accessing by the electronic device are same.

At block S308, the electronic device updates the blacklist and obtains the updated blacklist, and then disconnect connection between the second Wi-Fi network interface and the third AP.

At block S309, the electronic device determines a fourth AP based on the updated blacklist.

At block S310, the electronic device accesses the fourth AP through the second Wi-Fi network interface.

Embodiments provide a network connection control method and related products, performed by the electronic device. The method comprises: the electronic device accesses a first Access Point (AP) through a first Wi-Fi network interface of the electronic device, and accesses a second AP through a second Wi-Fi network interface of the electronic device. The electronic device disconnects connection with the second AP in response to detecting a first Internet Protocol (IP) address of the first AP and a second IP address of the second AP are same. The electronic device determines a third AP based on a first Media Access Control (MAC) address of the first AP and a second MAC address of the second AP and accesses a third AP through the second Wi-Fi network interface. Determining the third AP according to the first MAC address of the first AP and the second MAC address of the second AP, and then accessing the third AP, is beneficial to release the corresponding connection and re-selecting a new hotspot in time when there is a gateway IP conflict and the electronic device is in dual Wi-Fi mode. It guarantees the network quality and is conducive to improve the efficiency and convenience of network connection control.

In addition, after the electronic device accesses a third AP through the second Wi-Fi network interface, the electronic device determines whether the IP addresses of the two APs currently accessing by the electronic device are same. If same, the blacklist is updated and the electronic device obtains the updated blacklist. The electronic device disconnects connection between the second Wi-Fi network interface and the third AP, and then determines a fourth AP based on the updated blacklist, and finally accesses the fourth AP through the second Wi-Fi network interface. Performing the above operations until IP address and MAC address of two APs accessed by the electronic device are different with each other. It is beneficial to avoid network connection problems caused by IP address conflicts, and help improve the effectiveness and convenience of network connection control In accordance with FIG. 1A, FIG. 2, FIG. 3, FIG. 4 is a schematic architecture diagram of an electronic device 400 according to embodiments of the present disclosure. An electronic device 400 comprises one or more processors 410, a memory 420, a communication interface 430, and one or more programs 421, wherein the one or more programs 421 are stored in the memory 420 and configured to be executed by the one or more processors 410. The one or more programs 421 including instructions for performing the following.

Figure 4:
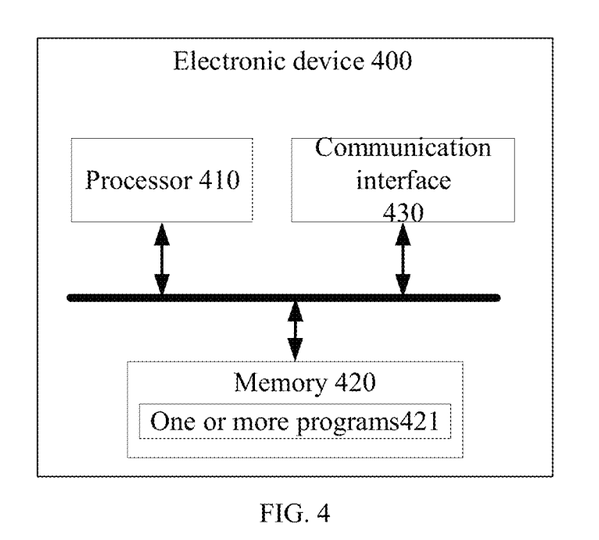
FIG. 4 is a schematic architecture diagram of an electronic device according to embodiments of the present disclosure.

A first Access Point (AP) is accessed through a first Wireless-Fidelity (Wi-Fi) network interface of the electronic device, and a second AP is accessed through a second Wi-Fi network interface of the electronic device.

Connection with the second AP is disconnected in response to detecting a first Internet Protocol (IP) address of the first AP and a second IP address of the second AP are same.

A third AP is determined based on a first Media Access Control (MAC) address of the first AP and a second MAC address of the second AP.

A third AP is accessed through the second Wi-Fi network interface.

Embodiments provide a network connection control method and related products, performed by the electronic device. The method comprises: the electronic device accesses a first Access Point (AP) through a first Wi-Fi network interface of the electronic device, and accesses a second AP through a second Wi-Fi network interface of the electronic device. The electronic device disconnects connection with the second AP in response to detecting a first Internet Protocol (IP) address of the first AP and a second IP address of the second AP are same. The electronic device determines a third AP based on a first Media Access Control (MAC) address of the first AP and a second MAC address of the second AP and accesses a third AP through the second Wi-Fi network interface. Determining the third AP according to the first MAC address of the first AP and the second MAC address of the second AP, and then accessing the third AP, is beneficial to release the corresponding connection and re-selecting a new hotspot in time when there is a gateway IP conflict and the electronic device is in dual Wi-Fi mode. It guarantees the network quality and is conducive to improve the efficiency and convenience of network connection control.

In an embodiment, to determine a third AP based on a first MAC address of the first AP and a second MAC address of the second AP, instructions included in the one or more programs configured to perform: obtaining a plurality of APs scanned by the second Wi-Fi network interface; storing the first MAC address and the second MAC address in a blacklist; matching MAC address of each of the plurality of APs with the blacklist, and determining the third AP, the third AP being one of the plurality of APs, the third AP satisfying a third MAC address of the third AP is not in the blacklist.

In an embodiment, to match MAC address of each of the plurality of APs with the blacklist, and determining the third AP, the third AP being one of the plurality of APs, instructions included in the one or more programs configured to perform: matching MAC address of each of the plurality of APs with the blacklist, and determining MAC address of at least one AP is not in the blacklist; obtaining network quality of the at least one AP, and selecting an AP with best network quality among the at least one AP as the third AP.

In an embodiment, after accessing a third AP through the second Wi-Fi network interface, instructions included in the one or more programs configured to perform: performing following operations until IP address and MAC address of two APs accessed by the electronic device are different; determining whether the IP addresses of the two APs currently accessing by the electronic device are same; updating the blacklist in response to the IP addresses are same, and obtaining the updated blacklist, and disconnecting connection between the second Wi-Fi network interface and the third AP; determining a fourth AP based on the updated blacklist; and accessing the fourth AP through the second Wi-Fi network interface.

In an embodiment, to update the blacklist, instructions included in the one or more programs configured to perform: detecting that an AP currently accessed by the first Wi-Fi network interface is the first AP and detecting that an AP currently accessed by the second Wi-Fi network interface is the third AP; and storing the third MAC address in the blacklist.

In an embodiment, to update the blacklist, instructions included in the one or more programs configured to perform: detecting that an AP currently accessed by the first Wi-Fi network interface is the fifth AP and detecting that an AP currently accessed by the second Wi-Fi network interface is the third AP; determining a fifth MAC address of the fifth AP is same with the first MAC address or the second MAC address in the blacklist; and storing the third MAC address in the updated blacklist.

In an embodiment, to update the blacklist, instructions included in the one or more programs configured to perform: detecting that an AP currently accessed by the first Wi-Fi network interface is the fifth AP and detecting that an AP currently accessed by the second Wi-Fi network interface is the third AP; determining a fifth MAC address of the fifth AP is not same with the first MAC address or the second MAC address in the blacklist; clearing the blacklist, and storing the fifth MAC address and the third MAC address in the updated blacklist.

The technical solutions of the embodiments of the present disclosure are mainly introduced from the perspective of execution process at the method side. It should be understood that, the electronic device includes hardware structures and/or software modules that execute various functions in order to implement the above functions. A person skilled in the art may be further aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Embodiments of the present disclosure may divide the functional modules of the electronic device according to the above method examples, for example, various functional modules may be divided corresponding to various functions, and two or more functions may be integrated in one processing module. The integrated module as described above may be achieved in the form of hardware, or may be achieved in the form of a software functional module. It should be noted that, the division of modules in embodiments of the present disclosure is illustrative, for example, the modules are just divided according to logic functions. In practical implementation, the modules can be divided in other manners.

Figure 5:
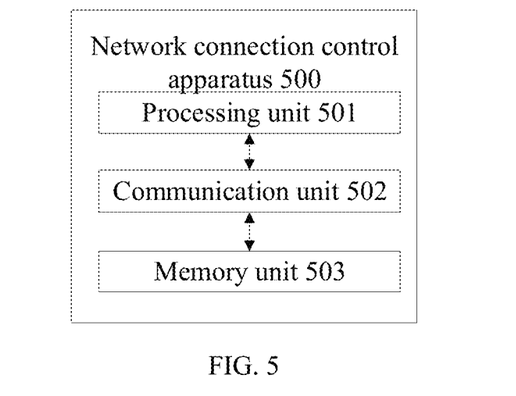
FIG. 5 is a block diagram illustrating the functional units of the network connection control apparatus according to embodiments of the present disclosure.

FIG. 5 is a block diagram illustrating the functional units of the network connection control apparatus. The network connection control apparatus 500 is for an electronic device, comprising a processing unit 501, a communication unit 502, and a memory unit 503.

The processing unit 501 is configured to access a first Access Point (AP) through a first Wireless-Fidelity (Wi-Fi)

network interface of the electronic device, and access a second AP through a second Wi-Fi network interface of the electronic device; disconnect connection with the second AP in response to detecting a first Internet Protocol (IP) address of the first AP and a second IP address of the second AP are same; determine a third AP based on a first Media Access Control (MAC) address of the first AP and a second MAC address of the second AP; and access a third AP through the second Wi-Fi network interface.

Embodiment provides a network connection control method and related products, performed by the electronic device. The method comprises: accessing a first Access Point (AP) through a first Wireless-Fidelity (Wi-Fi) network interface of the electronic device, and accessing a second AP through a second Wi-Fi network interface of the electronic device; disconnecting connection with the second AP in response to detecting a first Internet Protocol (IP) address of the first AP and a second IP address of the second AP are same; determining a third AP based on a first Media Access Control (MAC) address of the first AP and a second MAC address of the second AP; and accessing a third AP through the second Wi-Fi network interface. Determining the third AP according to the first MAC address of the first AP and the second MAC address of the second AP, and then accessing the third AP, is beneficial to release the corresponding connection and re-selecting a new hotspot in time when there is a gateway IP conflict and the electronic device is in dual Wi-Fi mode. It guarantees the network quality and is conducive to improve the efficiency and convenience of network connection control.

In an embodiment, to determine a third AP based on a first MAC address of the first AP and a second MAC address of the second AP, the processing unit 501 is configured to: obtain a plurality of APs scanned by the second Wi-Fi network interface; store the first MAC address and the second MAC address in a blacklist; match MAC address of each of the plurality of APs with the blacklist, and determine the third AP, the third AP being one of the plurality of APs, the third AP satisfying a third MAC address of the third AP is not in the blacklist.

In an embodiment, to match MAC address of each of the plurality of APs with the blacklist, and determine the third AP, the third AP being one of the plurality of APs, the processing unit 501 is configured to: match MAC address of each of the plurality of APs with the blacklist, and determine MAC address of at least one AP is not in the blacklist; obtain network quality of the at least one AP, and select an AP with best network quality among the at least one AP as the third AP.

In an embodiment, after accessing a third AP through the second Wi-Fi network interface, the processing unit 501 is further configured to: perform following operations until IP address and MAC address of two APs accessed by the electronic device are different; determine whether the IP addresses of the two APs currently accessing by the electronic device are same; update the blacklist in response to the IP addresses are same, and obtain the updated blacklist, and disconnect connection between the second Wi-Fi network interface and the third AP; determine a fourth AP based on the updated blacklist; and access the fourth AP through the second Wi-Fi network interface.

In an embodiment, to update the blacklist, the processing unit 501 is configured to: detect that an AP currently accessed by the first Wi-Fi network interface is the first AP and detect that an AP currently accessed by the second Wi-Fi network interface is the third AP; and store the third MAC address in the blacklist.

In an embodiment, to update the blacklist, the processing unit 501 is configured to: detect that an AP currently accessed by the first Wi-Fi network interface is the fifth AP and detect that an AP currently accessed by the second Wi-Fi network interface is the third AP; determine a fifth MAC address of the fifth AP is same with the first MAC address or the second MAC address in the blacklist; and store the third MAC address in the updated blacklist.

In an embodiment, to update the blacklist, the processing unit 501 is configured to: detect that an AP currently accessed by the first Wi-Fi network interface is the fifth AP and detect that an AP currently accessed by the second Wi-Fi network interface is the third AP; determine a fifth MAC address of the fifth AP is not same with the first MAC address or the second MAC address in the blacklist; clear the blacklist, and store the fifth MAC address and the third MAC address in the updated blacklist.

Embodiments of the disclosure provide a computer-readable storage medium stores one or more programs computer programs for electronic data exchange, wherein the one or more programs are configured to be executed to carry out some or all of the operations in any method in the above embodiments. The computer includes an electronic device.

Embodiments of the disclosure provide a computer program product, wherein the computer program product comprises a non-transitory computer-readable storage medium storing computer programs. The computer programs are configured to be executed to perform some or all of the operations in any method in the above embodiments. The computer program product can be a software installation package. The computer includes an electronic device.

It should be noted that, for convenience and simplicity of description, the above method embodiments are described in a form of a combination of a series of operations. However, those skilled in the art can understand clearly that, the present disclosure is not limited by the order of the operations, since some operations may be performed simultaneously or in other orders according to present disclosure. In addition, those skilled in the art can understand clearly that, the described embodiments are preferred embodiments, of which relative operations or modules may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of operations in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or an optical disk.

It should be understood that all or a part of the method provided by the present disclosure may be realized by programs instructing relative hardware, the programs may be stored in a computer-readable memory. The memory may include a flash disk, an ROM, an RAM, a magnet disk, an optical disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A network connection control method for an electronic device, comprising:
    accessing a first Access Point, AP, through a first Wireless-Fidelity, Wi-Fi, network interface of the electronic device, and accessing a second AP through a second Wi-Fi network interface of the electronic device;
    disconnecting the access to the second AP in response to detecting a first Internet Protocol, IP, address of the first AP and a second IP address of the second AP are the same;
    determining a third AP based on a first Media Access Control, MAC, address of the first AP and a second MAC address of the second AP, wherein a third MAC address of the third AP differs from the first MAC address and the second MAC address; and
    accessing the third AP through the second Wi-Fi network interface.

2. The method of claim 1, wherein the determining the third AP based on the first MAC address of the first AP address and the second MAC address of the second AP comprises:
    obtaining a plurality of APs scanned by the second Wi-Fi network interface;
    storing the first MAC address and the second MAC address in a blacklist;
    determining the third AP by comparing MAC addresses of each of the plurality of APs with the blacklist, wherein the third MAC address of the third AP is not on the blacklist.

3. The method of claim 2, wherein the determining the third AP by comparing the MAC addresses of each of the plurality of APs with the blacklist, comprises:
    determining a MAC address of at least one AP of the plurality of APs that is not in the blacklist; and
    obtaining network quality of the at least one AP, and selecting an AP with best network quality among the at least one AP as the third AP.

4. The method of claim 2, further comprising:
    after the accessing the third AP through the second Wi-Fi network interface,
    performing the following operations until the IP address and the MAC address of two APs accessed by the electronic device are different;
    determining whether the IP addresses of the two APs accessing by the electronic device are the same;
    updating the blacklist in response to the IP addresses being the same, and obtaining the updated blacklist, and disconnecting the access between the second Wi-Fi network interface and the third AP;
    determining a fourth AP based on the updated blacklist; and
    accessing the fourth AP through the second Wi-Fi network interface.

5. The method of claim 4, wherein the updating the blacklist comprises:
    detecting that an AP accessed by the first Wi-Fi network interface is the first AP and detecting that an AP accessed by the second Wi-Fi network interface is the third AP; and
    storing the third MAC address in the blacklist.

6. The method of claim 4, wherein the updating the blacklist comprises:
    detecting that an AP accessed by the first Wi-Fi network interface is a fifth AP and detecting that an AP accessed by the second Wi-Fi network interface is the third AP;
    determining that the fifth MAC address of the fifth AP is same as the first MAC address or the second MAC address in the blacklist; and
    storing the third MAC address in the updated blacklist.

7. The method of claim 4, wherein the updating the blacklist comprises:
    detecting that an AP accessed by the first Wi-Fi network interface is a fifth AP and detecting that an AP accessed by the second Wi-Fi network interface is the third AP;
    determining a fifth MAC address of the fifth AP is not same with the first MAC address or the second MAC address in the blacklist; and
    clearing the blacklist, and storing the fifth MAC address and the third MAC address in the updated blacklist.

8. The method of claim 1, further comprising:
    after the detecting a first IP address of the first AP and a second IP address of the first AP are same,
    maintaining an independent ARP cache for the first network assessed by the second Wi-Fi network interface and the second network assessed by the second Wi-Fi network interface respectively in an ARP cache of the electronic device, the first network and the second network each only querying its own ARP cache.

9. The method of claim 1, wherein the first AP and the second AP are different access point devices.

10. An electronic device, comprising:
    one or more processors; and
    memory configured to store instructions which, when executed by the one or more processors, cause the one or more processors to:

access a first Access Point, AP, through a first Wireless-Fidelity, Wi-Fi, network interface of the electronic device, and accessing a second AP through a second Wi-Fi network interface of the electronic device;

disconnect the access to the second AP in response to detecting a first Internet Protocol, IP, address of the first AP and a second IP address of the second AP are the same;

determine a third AP based on a first Media Access Control, MAC, address of the first AP and a second MAC address of the second AP, wherein a third MAC address of the third AP differs from the first MAC address and the second MAC address; and access the third AP through the second Wi-Fi network interface.

11. The electronic device of claim 10, wherein to determine the third AP based on the first MAC address of the first AP address and the second MAC address of the second AP comprises:

obtain a plurality of APs scanned by the second Wi-Fi network interface;

store the first MAC address and the second MAC address in a blacklist; and determine the third AP by comparing MAC addresses of each of the plurality of APs with the blacklist, wherein the third MAC address of the third AP is not on the blacklist.

12. The electronic device of claim 11, wherein to determine the third AP by comparing the MAC addresses of each of the plurality of APs with the blacklist comprises:

determine a MAC address of at least one AP of the plurality of APs that is not in the blacklist; and obtain network quality of the at least one AP, and select an AP with best network quality among the at least one AP as the third AP.

13. The electronic device of claim 11, the instructions further cause the one or more processors to:

after to access the third AP through the second Wi-Fi network interface, perform the following operations until the IP address and the MAC address of two APs accessed by the electronic device are different;

determine whether the IP addresses of the two APs accessing by the electronic device are the same;

update the blacklist in response to the IP addresses being the same, and obtain the updated blacklist, and disconnect the access between the second Wi-Fi network interface and the third AP;

determine a fourth AP based on the updated blacklist; and access the fourth AP through the second Wi-Fi network interface.

14. The electronic device of claim 13, wherein to update the blacklist comprises:

detect that an AP accessed by the first Wi-Fi network interface is the first AP and detect that an AP accessed by the second Wi-Fi network interface is the third AP; and store the third MAC address in the blacklist.

15. The electronic device of claim 13, wherein to update the blacklist comprises:

detect that an AP accessed by the first Wi-Fi network interface is a fifth AP and detect that an AP accessed by the second Wi-Fi network interface is the third AP;

determine that the fifth MAC address of the fifth AP is same as the first MAC address or the second MAC address in the blacklist; and storing the third MAC address in the updated blacklist.

16. The electronic device of claim 13, wherein to update the blacklist comprises:

detect that an AP accessed by the first Wi-Fi network interface is a fifth AP and detect that an AP accessed by the second Wi-Fi network interface is the third AP;

determine a fifth MAC address of the fifth AP is not same with the first MAC address or the second MAC address in the blacklist; and clear the blacklist, and store the fifth MAC address and the third MAC address in the updated blacklist.

17. The electronic device of claim 10, the instructions further cause the one or more processors to:

after to detect a first IP address of the first AP and a second IP address of the first AP are same, maintain an independent ARP cache for the first network assessed by the second Wi-Fi network interface and the second network assessed by the second Wi-Fi network interface respectively in an ARP cache of the electronic device, the first network and the second network each only querying its own ARP cache.

18. The electronic device of claim 10, wherein the first AP and the second AP are different access point devices.

19. A non-transitory computer-readable storage medium stores one or more programs computer programs for electronic data exchange, wherein the one or more programs are configured to:

access a first Access Point, AP, through a first Wireless-Fidelity, Wi-Fi, network interface of an electronic device, and accessing a second AP through a second Wi-Fi network interface of the electronic device;

disconnect the access with the second AP in response to detecting a first Internet Protocol, IP, address of the first AP and a second IP address of the second AP are the same; and determine a third AP based on a first Media Access Control, MAC, address of the first AP and a second MAC address of the second AP, wherein a third MAC address of the third AP differs from the first MAC address and the second MAC address; and access the third AP through the second Wi-Fi network interface.

20. The non-transitory computer-readable storage medium of claim 19, wherein to determine the third AP based on the first MAC address of the first AP address and the second MAC address of the second AP comprises:

obtain a plurality of APs scanned by the second Wi-Fi network interface;

store the first MAC address and the second MAC address in a blacklist; and determine the third AP by comparing MAC addresses of each of the plurality of APs with the blacklist, wherein the third MAC address of the third AP is not on the blacklist.

* * * * *